PULSE TELEMETERING APPARATUS FOR TRANSMITTING TO A REMOTE LOCATION THE VALUE OF A MAGNITUDE

Filed Dec. 28, 1960

INVENTOR
Raoul Marlot
BY
Larson and Taylor
ATTORNEY

INVENTOR
Raoul Marlot
BY
Larson and Taylor
ATTORNEY

INVENTOR
Raoul Marlot
BY Larson and Taylor
ATTORNEY

INVENTOR
Raoul Marlot
BY
Larson and Taylor
ATTORNEY

Jan. 25, 1966 R. MARLOT 3,231,877

PULSE TELEMETERING APPARATUS FOR TRANSMITTING TO A REMOTE LOCATION THE VALUE OF A MAGNITUDE

Filed Dec. 28, 1960 8 Sheets-Sheet 5

INVENTOR
Raoul Marlot
BY
Larson and Taylor
ATTORNEY

INVENTOR
Raoul Marlot
BY
Larson and Taylor
ATTORNEY

INVENTOR
Raoul Marlot
BY
Larson and Taylor
ATTORNEY

INVENTOR
Raoul Marlot
BY
Larson and Taylor
ATTORNEY 3,231,877
Patented Jan. 25, 1966

3,231,877

PULSE TELEMETERING APPARATUS FOR TRANSMITTING TO A REMOTE LOCATION THE VALUE OF A MAGNITUDE

Raoul Marlot, Saint-Jean-de-Luz, France, assignor to Electricite de France, Service National, Paris, France, a society of France Filed Dec. 28, 1960, Ser. No. 78,897
Claims priority, application France, Feb. 17, 1960, 818,797
5 Claims. (Cl. 340—206)

The present invention, which is a continuation-in-part of my U.S. patent application Ser. No. 688,159, filed October 4, 1957, now U.S. Patent No. 3,067,941, patented December 11, 1962, relates to an apparatus for transmitting to a remote location the value Q of a magnitude. More generally the invention is concerned with metering, displaying and/or controlling at a remote location. In said prior patent, where I described and claimed more particularly a wattmeter or apparatus for counting the consumption of electrical energy in a network, I also disclosed a telemetering system comprising a transmitter capable of delivering, by means of an integrator-comparator circuit such as used in said counting apparatus, a succession of signals the period of repetition $t_0$ of which is such that the product $Qxt_0$ is equal to a given fixed value, and a receiver adapted to measure said period $t_0$ of said signals transmitted thereto.

The object of the present application is to describe particular embodiments of such a telemetering system.

Such embodiments will be hereinafter described with reference to the appended drawings, given merely by way of example, and in which:

FIG. 1 diagrammatically shows a telemetering system according to the present invention for transmitting the value of a magnitude to a remote location.

Figure 1:
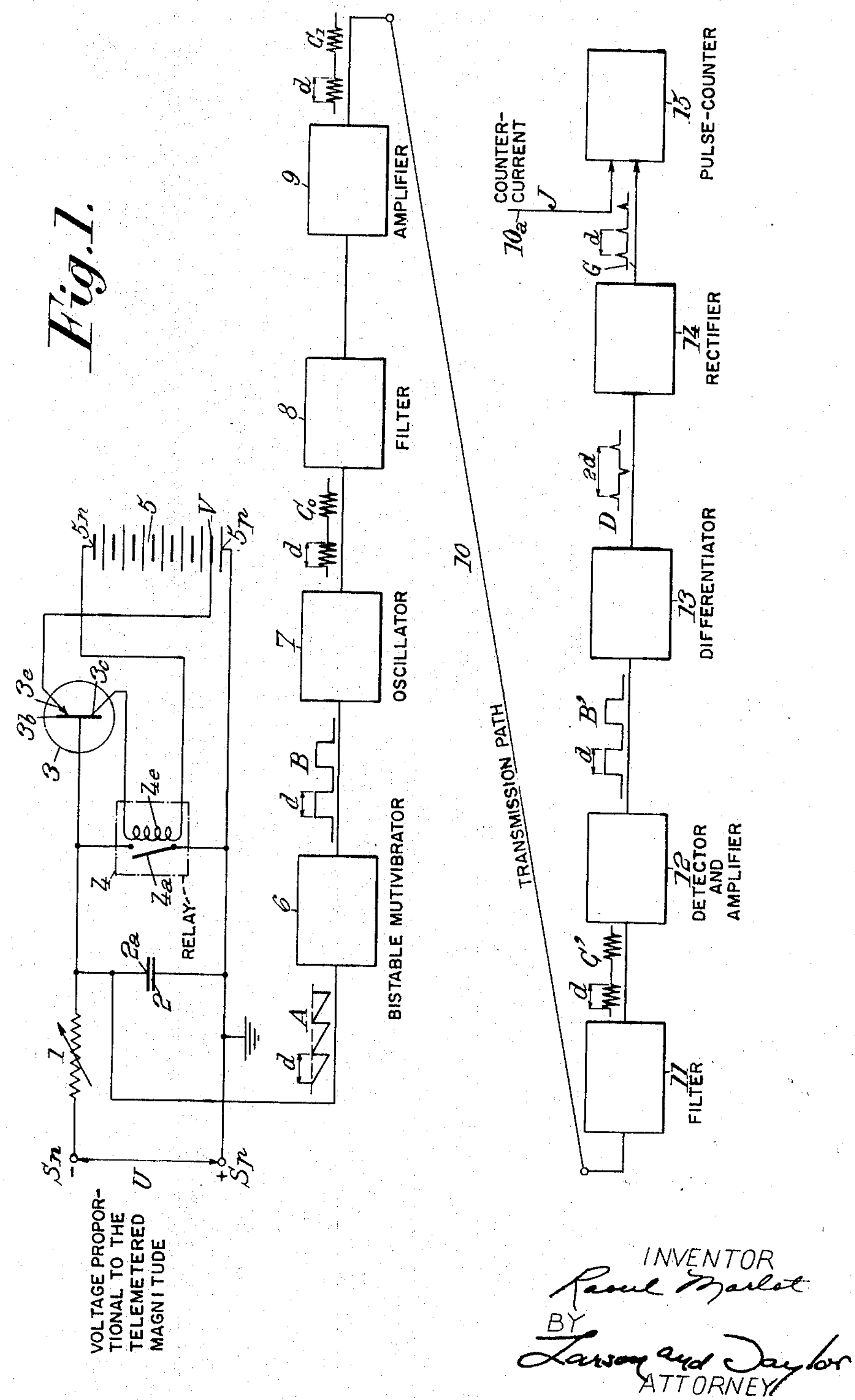
Figure 7A:
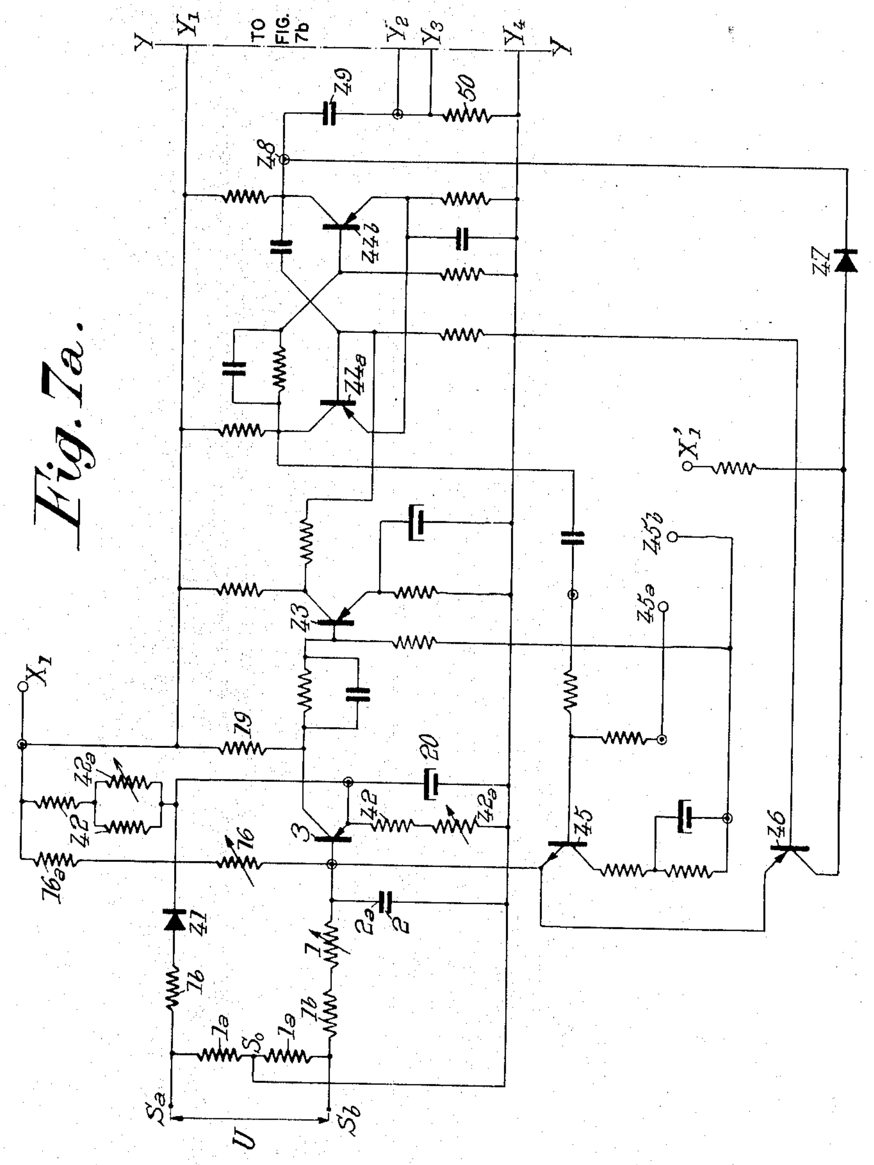
Figure 7B:
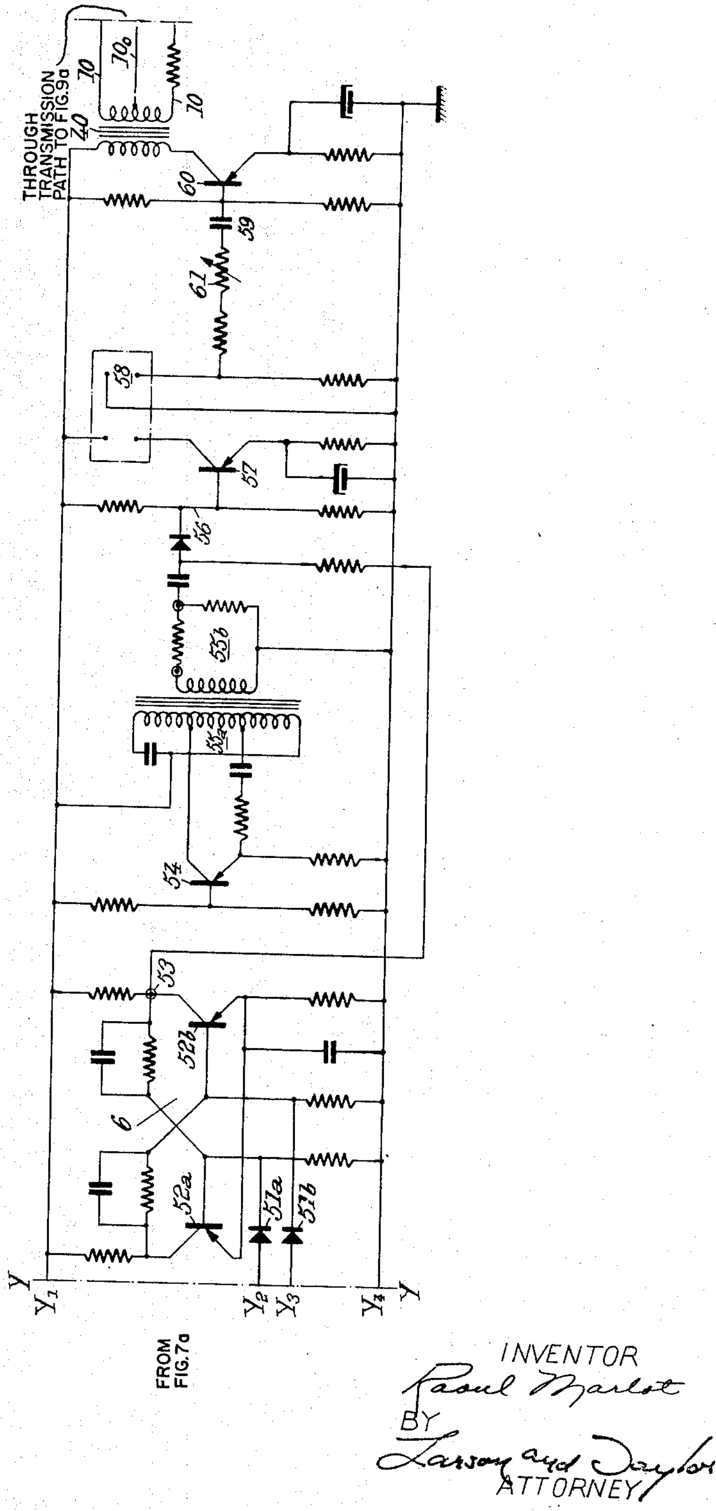

FIG. 7 (divided into two portions 7*a* and 7*b* to be assembled along line Y—Y) shows a complete embodiment of the transmitter portion of the telemetering system of FIG. 1.

Figure 8:
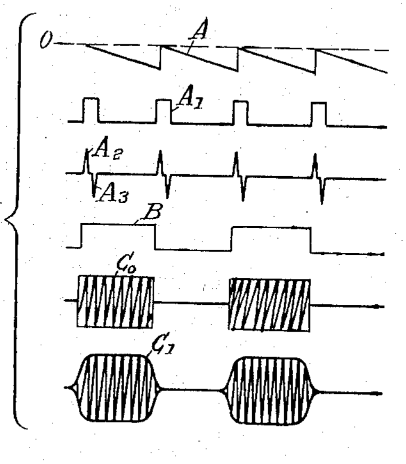

FIG. 8 illustrates the form of the signals at different points of the apparatus of FIG. 7.

Figure 9A:
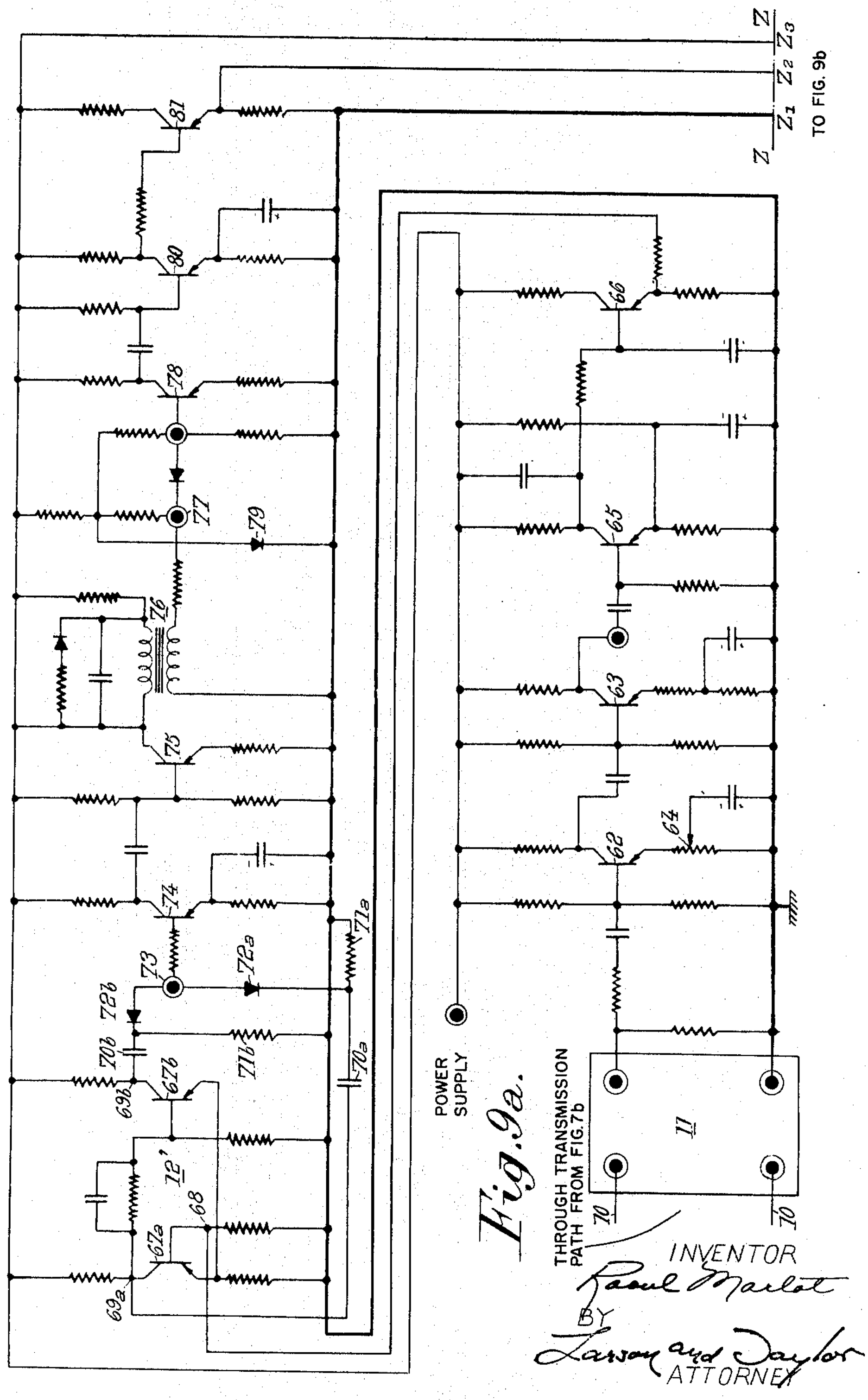
Figure 9B:
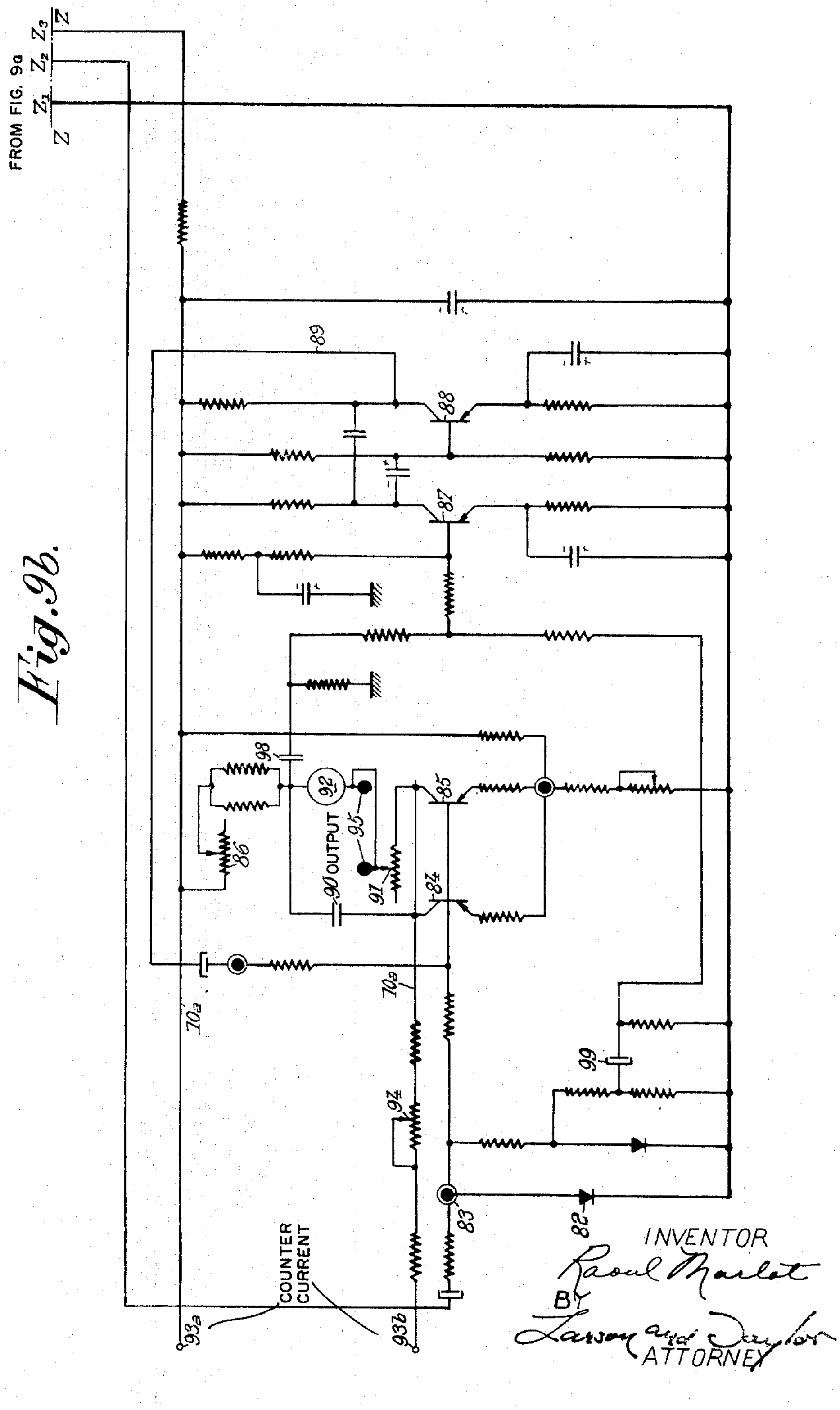

FIG. 9 (divided into two portions 9*a* and 9*b* to be assembled along line Z—Z) shows the receiver portion of the telemetering apparatus of FIG. 1.

Figure 10:
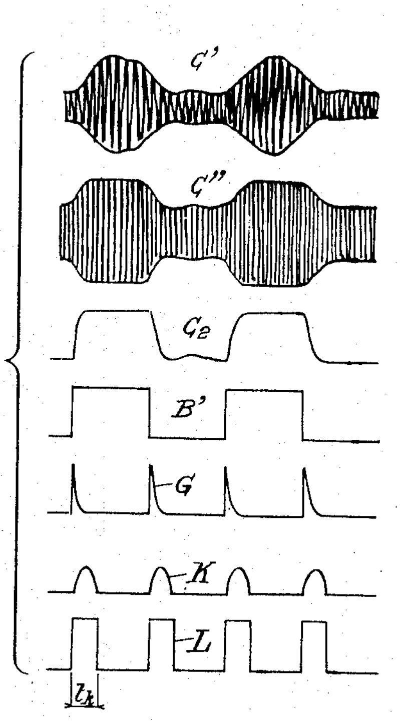

FIG. 10 illustrates the form of the signals at different points of the apparatus of FIG. 9.

The system of FIG. 1 comprises means (for instance wattmetric means, FIG. 4, or potentiometric means, FIG. 5) for transforming the magnitude to be transmitted to a remote location into a voltage U proportional to the value of said magnitude, an integrator-comparator device circuit 1, 2, 3, 4, 5 of the type described in my above mentioned prior patent for delivering a succession of electric signals A the frequency of which is substantially a linear function of said voltage applied thereto, means 6, 7, 8, 9, 10 for transmitting to a remote location, without any appreciable nonlinear distortion, this succession of electric signals (preferably by modulation at the transmitter of a carrier frequency by means of calibrated signals B deriving from said electric signals A while maintaining the linearity law) and means 11, 12, 13, 14, 15 for deriving from the succession of signals thus transmitted a signal which is a function of the frequency of said transmitted signals (preferably by integration of calibrated signals obtained by demodulating the carrier frequency in the receiver).

More particularly, FIG. 1 shows the integrator-comparator circuit made as described in said above mentioned prior patent for transforming a unidirectional voltage U (itself proportional to the value of the magnitude the measurement of which is to be transmitted) into signals the frequency $f$ of which is substantially a linear function of this magnitude Q.

The integrator stage consists of a circuit including in series a resistor 1 and a capacitor 2, which circuit is charged with voltage U, applied across the input terminals $S_n$ and $S_p$, the latter one being the positive terminal, connected to the ground. Capacitor 2 is therefore charged through resistor 1 first in a substantially linear manner (it will be explained hereinafter, with reference to FIGS. 2 and 3, how a final linearity as perfect as possible is obtained although the normal charging of a circuit including in series a resistor and a capacitor is exponential), the negative charge of the plate $2_a$ of capacitor 2 increasing in absolute value.

The comparator stage essentially comprises a transistor 3 (for instance a junction transistor of the p-n-p type) the base $3_b$ of which is connected to plate $2_a$, the emitter $3_e$ of which is brought to a reference negative potential V and the collector $3_c$ of which is connected to one of the terminals of the winding $4_e$ of a relay (which may be a wholly static relay) the armature $4_a$ of which short-circuits capacitor 2 when current is supplied to winding $4_e$. The other terminal of winding $4_e$ is connected to the terminal $5_n$ of a voltage source 5 (for instance of 24 volts) the positive terminal $5_p$ of which is connected to the ground, this source serving also to supply the reference voltage (for instance of 1.5 volts).

The operation of the integrator-comparator circuit, the two stages of which have just been described is as follows:

As long as the charge —E of plate $2_a$ is lower in absolute value than the reference potential —V, the collector $3_c$ of transistor 3 supplies only a very small current (of some microamperes) through the winding $4_e$ of relay 4. On the contrary, as soon as E exceeds V, in absolute value, the current becomes high in the collector circuit and winding $4_e$ causes armature $4_a$ to be moved toward the right. This causes capacitor 2 to be discharged. Current ceases to pass through the collector circuit which deenergizes relay 4. The situation has thus returned to the initial state shown by FIG. 1 and a new cycle starts again.

I thus obtain on plate $2_a$ a voltage A which varies substantially in saw-tooth fashion, the time interval $d$ (corresponding to the repetition period mentioned in the aforementioned prior application) between two teeth being inversely proportional to U which means that the frequency $f$ of the teeth is proportional to U.

In order to obtain a correct transmission of signals A to a remote location, I transform the saw-teeth into calibrated rectangular pulses B in a known manner in a bistable multivibrator 6. These pulses B, of a width equal to $d$, are used to trigger a sinusoidal oscillator 7, thus amplitude modulating the carrier frequency supplied by this oscillator. The signal $C_0$ that is obtained consists of a succession of electrical signals or of wave trains of a duration equal to $d$. After passage through an electric filter 8 and an amplifier 9, the resulting wave trains $C_1$ are transmitted through a cable 10 (preferably with two conductors) or by radio toward the receiver station.

Reception is obtained by means of calibrated pulses. For this purpose, the wave trains that are received are filtered in a filter 11, which gives a wave train C′ similar to $C_0$, then detected and amplified in unit 12 so as to reconstitute rectangular pulses B′ which are similar to pulses B. These pulses B′ are differentiated in a unit 13 and the resulting voltage peaks D are rectified in a unit 14 which supplies a calibrated pulse G for every discharge of capacitor 2, these pulses being counted in a pulse counter 15 or transformed in an integrator into a current proportional to their frequency $f$ as hereinafter described with reference to FIGS. 9 and 10, the intensity of this current being read on an ammeter or recorded.

Figure 2:
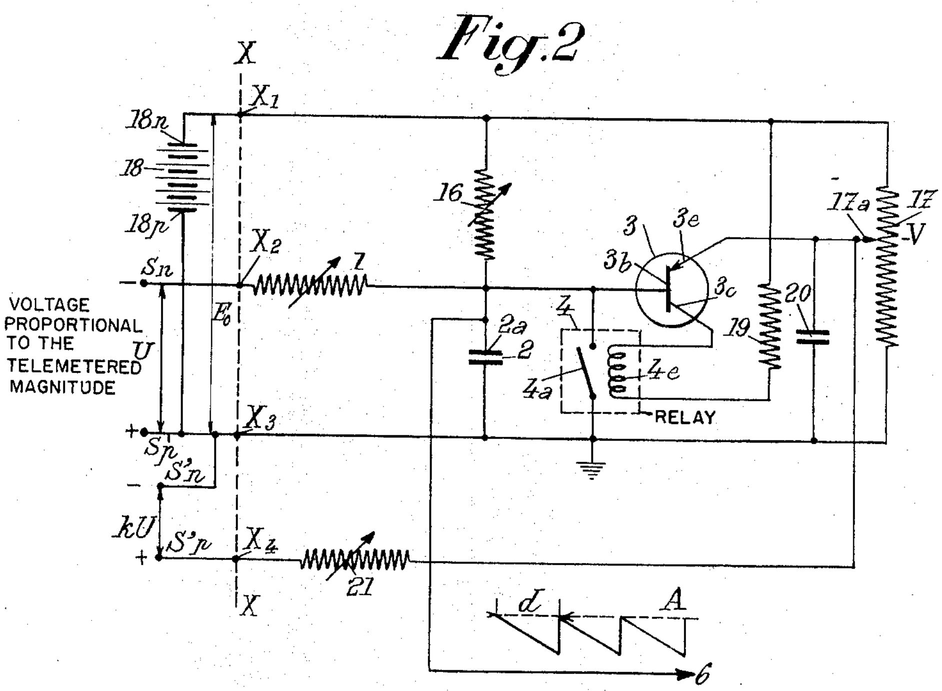
FIG. 2 shows an embodiment of the portion of the system of FIG. 1 that transforms a unidirectional voltage, proportional to the magnitude to be transmitted, into electrical signals the frequency of which is a linear function of the value of this magnitude.
Figure 3:
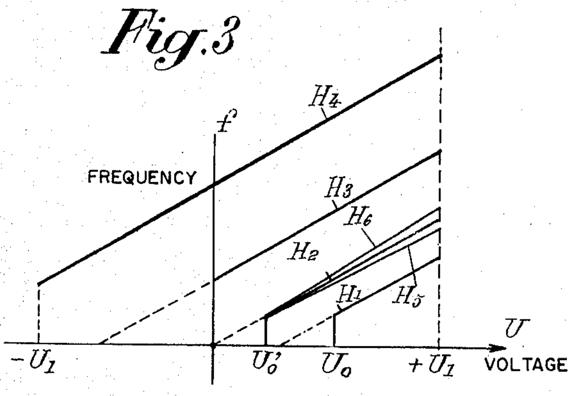
FIG. 3 illustrates the relation between the frequency of the outgoing signals and the values of said unidirectional voltage as obtained with the arrangement of FIG. 2.

The layout of FIG. 2 and the curves of FIG. 3 show how it is possible to correct the errors introduced during telemetering by the lack of linearity of the charging of capacitor 2 and by the dead times (discharge of capacitor 2, operation of relay 4 and so on . . .).

It will first be noted that the charging of capacitor 2 is not linear but exponential since $E=U(1-e^{-t/T})$ if C is the capacity of capacitor 2, R the value of resistor 1 and if T is the time constant ($T=CR$).

Consequently, the time interval $d$ between two operations of relay 4 (that is to say between two consecutive times where $E=V$) is given by $$V=U(1-e^{-d/T}) \qquad (1)$$

and if $m=d/T$, the relation becomes $$\frac{U}{V}m=\frac{m}{1-e^{-m}}$$

If the second member of this relation is developed in series only the first terms of which are kept, $$\frac{U}{V}m=1+\frac{m}{2}+\frac{m^2}{12}$$

that is to say $$U=\frac{V}{m}+\frac{V}{2}+\frac{Vm}{12}$$

If $m$ is sufficiently small, the term $$\frac{Vm}{12}$$

may be neglected and then $$U=\frac{V}{m}+\frac{V}{2}$$

It follows that the frequency $f$ of operation of the relay (which is equal to $1/d$, that is to say to $1/mT$ is given by the formula $$f=\frac{U-\frac{V}{2}}{VT} \qquad (2)$$

Since $$\frac{1}{VT}$$

and $$\frac{1}{2T}$$

are positive constants, the curve representing the frequency $f$ as function of voltage U (FIG. 3) is a straight line $H_1$ which does not pass through the origin of coordinates. Of course only the solid line portion of line $H_1$ is to be used because, as above stated Equation 2 is accurate only insofar as $m$ is sufficiently small (i.e. $f$ is sufficiently great).

If I add the reaction resistance 16, of adjustable value R′, Equation 1 becomes $$\left(\frac{1}{R}+\frac{1}{R'}\right)V=\left(\frac{U}{R}+\frac{E}{R'}\right)\left(1-e^{\frac{-t}{T}}\right)$$

and Equation 2 may be written with the same approximation $$f=\frac{U-V\frac{R+R'}{2R'}+\frac{RE}{R'}}{VT}$$

therefore $f=cU-d_2$ ($d_2$ being a constant which is positive, equal to zero or negative).

If $$E<V\frac{R+R'}{2R}$$

$d_2$ is positive and the conditions are those above mentioned (curve of type $H_1$).

If $$E=V\frac{R+R'}{2R}$$

$d_2$ is zero and there is a complete proportionality between $f$ and $$U{:}f=\frac{U}{VT} \qquad (5)$$

which corresponds to curve $H_2$.

If $$E>V\frac{R+R'}{2R}$$

$d_2$ is negative and the conditions may be first those of curve $H_3$ which deletes any limit value for U, and then of curves such as $H_4$ for which it is possible to measure voltages U of reverse polarities, ranging for instance from $-U_1$ to $+U_1$, which is of interest for the telemetering of magnitudes which may be of either polarity.

Of course, when $d_2$ is positive or negative, $f$ is not proportional to U; it will then be necessary to inject through line 10*a* (FIG. 1) a constant correction J (proportional to $d_2$) into counter 15 or the ammeter (or recorder) disposed at the output of unit 14.

It can then be seen that it is possible to displace the straight line representative of $f=cU-d_2$ parallelly to itself by mere variation of —V (FIG. 3). It suffices to correct voltage —V by means of the slider 17*a* of a potentiometer 17 inserted between negative terminal 18*n*, having the potentional $-E_0$ of a current source 18 and the ground, this terminal 18*n* being connected through feedback resistor 16 to the negative plate $2_a$ of a capacitor, whereas the postive terminal 18*p* of source 18 is connected to the ground.

Furthermore, it will be noted, on the one hand, that winding $4_e$ is also connected to terminal 18*n* through a resistor 19 and, on the other hand, that there is provided across, the terminals of the reference voltage V a capacitor 20 of high capacity (which can be built of relatively small volume) to keep at a constant value the potential of the transmitter $3_e$ during the operation of the transistor, this capacitor having also for its effect to short-circuit the residues at 100 cycles per second when $E_0$ is obtained by rectification of the current from an alternating network (instead of being supplied by a battery as shown).

In the preceding calculation, account has not been taken of the dead time $t_1$ which exists at the end of every operation of the relay; this dead time which is produced by the operation of relay 4 and the discharge of capacitor 2 is substantially constant when U varies (it may average from 0.2 to 0.4 millisecond).

Equation 1 then becomes $$V=U\left(1-e^{\frac{-d-t_1}{T}}\right)$$

and with the antiexponential feedback Equation 5 will be replaced by $$f\left(1+\frac{Ut_1}{VCR}\right)=\frac{U}{VCR} \quad (6)$$

and curve $H_2$ becomes $H_5$.

It is possible to remedy to this deviation, substantially proportional to U, by correcting V by an amount proportional to U. For this purpose, there may be provided an input $S'_nS'_p$ where there is applied a voltage $k$U proportional to U ($S'_n$ being the negative terminal connected to the earth and $S'_p$ the positive terminal) and a feedback resistance 21 the value of which is adjusted so that $$V=V_0-\frac{Ut_1}{CR}$$

Therefore, Equation 6 becomes $$f=\frac{U}{V_0t}$$

which is consequently of the type of Equation 5 so that proportionality is restored.

Figure 5:
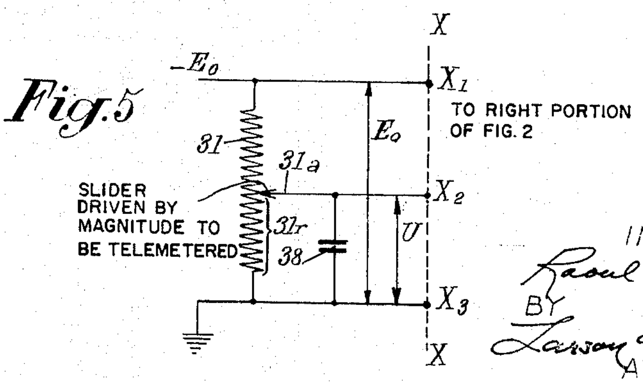
FIG. 5 shows a potentiometric arrangement adapted to be connected to the input of the arrangement of FIG. 2, along junction line X—X, in order to ensure telemetering of a non electric magnitude.
Figures 4, 6:
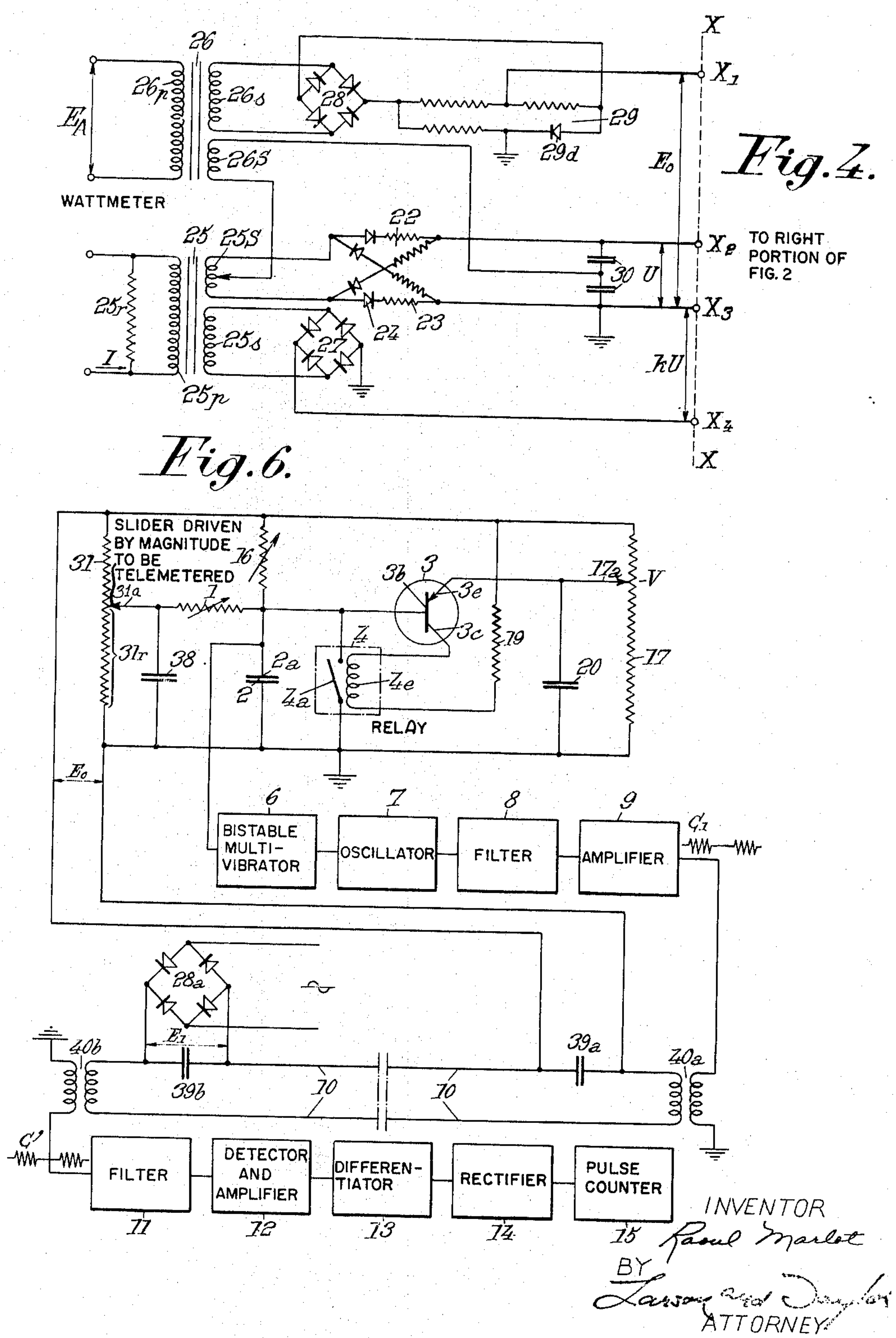
FIG. 4 shows an electronic wattmeter adapted to be connected to the input of the arrangement of FIG. 2, along junction line X—X, in order to ensure telemetering of an electric energy.
FIG. 6 shows a system particularly suitable for the telemetering of a non electric magnitude and including improvements according to the present application.

Before describing in detail a preferred embodiment of the transmitter and receiver according to FIG. 1, I will give, with reference to FIGS. 4 and 5, two examples of means capable of transforming a magnitude to be measured into a voltage U proportional to this magnitude, this voltage U being applied between $S_n$ and $S_p$ to be transformed into pulses the frequency $f$ of which is proportional to U (in devices according to FIGS. 1 or 2).

FIG. 4 illustrates wattmetric means for telemetering of an electric power and comprises means for producing also the correcting voltage $k$U above mentioned, whereas FIG. 5 illustrates potentiometric means for any telemetering. In this case, it is possible sufficiently to increase the time constant T (by varying the value R of the adjustable resistor 1) to render $$\frac{Ut_1}{VT}$$

negligible, and therefore negligible the error introduced by the dead time. Furthermore, I may considerably reduce this dead time by replacing relay 1 by a transistor arrangement as hereinafter described with reference to FIG. 7.

In order to transform an active power SI cos $\varphi$, supplied by an alternating current of voltage S, current intensity I and phase $\varphi$, into a voltage U proportional to this power, I may use the arrangement shown by FIG. 4 which essentially comprises a ring phase-converter 22 comprising four branches, in each of which I dispose a resistor 23 of value $r$ and a silicon diode 24 having a negligible reverse current, the variation of the resistance of a diode being negligible compared to $r$ in direct operation (resistors 23 having as a matter of fact for their function to eliminate the variations of resistance of the diodes).

This phase-converter receives a component $i$ through the secondary 25S of a transformer 25 the primary $25_p$ of which is fed with a current I (proportional to that the power of which is to be measured and which is made to pass through a resistor **25*r*) and a component $e$ through the secondary 26S of a transformer 26 (the primary $26_p$** of which is fed with the voltage S of the current the power of which is to be measured) and it determines a voltage $U=k_1ei \cos \varphi$ ($k_1$ being a constant).

The other secondaries **25*s* and 26*s* of transformers 25 and 26 supply (respectively through a bridge arrangement of rectifiers 27 and through the combination of a bridge of rectifiers 28 and a bridge of resistors 29 one of which 29*d* consists of a diode having a supplementary rectification) a voltage $k$U proportional to U and a reference voltage $E_0$ intended to replace that supplied by battery 18** in the arrangement of FIG. 2 (in the prior patent above referred to, it has been indicated why the reduced varitions of $E_a$ have a negligible influence on frequency $f$).

Condensers 30 have for their effect to eliminate the residues at 50 cycles per second of the network, the residues to 100 cycles per second being eliminated by capacitor 20 (FIG. 2) in the normal case where FIG. 4 is juxtaposed to the portion of FIG. 2 located on the right hand side of line X—X which then constitutes a junction line between these two figures by connection of the terminals $X_1$, $X_2$, $X_3$ and $X_4$ of the two figures.

The diagram of FIG. 4 may be modified either to permit the transformation of the reactive power into a voltage U proportional to this power while dispensing with resistor **25*r* or to permit the transformation of the apparent power into a voltage U proportional to this power by substituting for phase-converter 22 a mere rectifier including four diodes (resistors 23** being dispensed with).

In order to effect telemetering of any magnitude Q (the height of a level, a temperature, a pressure, etc. . . .), it suffices, in order to transform this magnitude Q into a voltage U applicable to the arrangements of FIGS. 1 and 2, to provide a potentiometer controlled as shown on FIG. 5.

The slider **31*a* of potentiometer 31, mounted between the source of potential $E_0$ (battery or rectifier) and the ground, is displaced by the measurement apparatus so that the partial resistance 31*r* (and therefore U) is proportional to the magnitude to be measured, capacitor 38** filtering the alternating currents.

Due to the fact that terminals $X_1$, $X_2$, and $X_3$ of FIGS. 5 and 2 are connected together (while eliminating the portion of this last mentioned figure which is located on the left hand side of line X—X which then constitutes the junction line between these two figures) the partial resistance **31*r*** of the potentiometer has an effect on the time constant T of the integrator stage, this constant varying between CR for $U=0$ and $U=U_0$ and $$C\frac{R+r'}{4}$$

for $$U=\frac{U_0}{2}$$

($r'$ being the total resistance of potentiometer 31). This produces a modification of the shape of curves H ($H_2$ becoming $H_6$). Therefore care will be taken that $r'$ is small with respect to R. Furthermore $r'$ may be chosen such that the variation of T resulting therefrom compensates the distortion due to the dead time (curve $H_5$) which permits of eliminating the $k$U feed of FIG. 2, this feed being no longer included in the arrangement of FIG. 5.

It will be noted that the whole of the transmitter of FIGS. 5 and 2 is fed with a single voltage $E_0$ so that E and V vary proportionally and the relation $$f=\frac{U}{VT}$$

shows that $f$ is independent of $E_0$ which may be obtained by rectification of an available alternating current or by sending direct current through the transmission cable itself from the receiver when there is no electrical energy available at the transmitter station. It is thus possible to have an arrangement as shown by FIG. 6 which contains the elements of FIGS. 1, 2 and 5 (without the correcting voltage $k$U, the variation of T due to the variation of **31*r*** compensating for the lack of linearity of curve H caused by the dead time).

In FIG. 6, I have used the same reference numerals as in FIGS. 1, 2 and 5 to designate equivalent elements such as, at the transmitter, the potentiometric means 31 to transform magnitude Q into voltage U, the integrator stage 1–2 which is linearly charged as a function of U, the comparator stage 3 which, when the charge of condenser 2 reaches a reference value —V, causes capacitor 2 to discharge through relay 4 and saw-toothed signals of frequency $f$ (which is a linear function of Q) to be sent toward the bistable multivibrator 6, and finally the units 6, 7, 8, 9 which produce the wave train $C_1$ to be transmitted.

Transmission is effected through a cable 10, and the receiver includes units 11, 12, 13, 14 and 15 which, from the wave train C′ that is received, determine the frequency $f$ of discharges of the capacitor and therefore the value of Q. The receiver further comprises, to supply the transmitter with a reference voltage $E_0$, a bridge of rectifiers 28*a* to transform the alternating current of the network into a direct current of voltage $E_1$ (higher than $E_0$ so as to take into account the losses in the line) which is applied between the two conductors of cable 10. Separation between the direct and alternating components is effected, at the transmitter, through a capacitor 39*a* and a transformer coupling, at 40*a*, with transmission cable 10 and, at the receiver, by a capacitor 39*b* and a transformer coupling at 40*b*, with the transmission cable.

On FIG. 7, I have shown the complete lay-out of a telemetering transmitter according to the invention with the exception of the means for transforming the magnitude Q to be telemetered into a voltage U proportional thereto (which means may for instance be of the type illustrated by FIG. 5 or by FIG. 4).

In the general case, when it is desired to transmit negative values of Q as well as positive ones, I make use of a symmetrical input with two terminals S*a*, S*b* between which is applied the voltage U (the connection to the ground of terminal $X_3$ illustrated by FIGS. 4 and 5 being omitted) and I connect with the ground a middle point $S_0$ between two identical resistors 1*a*. The integrator circuit then comprises, in addition to capacitor 2 and resistors 1 and 1*a*, two resistors 1*b* and a diode 41 for charging plate 2*a* with a negative voltage. Voltage $E_0$ (for instance of —24 volts) is applied at $K_1$ and I adjust the potential —V (of the order of —3 volts) of the emitter of the comparator transistor 3 by means of adjustable resistors 42*a* provided in the chain of resistors 42 between $X_1$ and the ground (capacitor 20 having for its effect to keep at a constant value this bias even during the period of conduction of the transistor), the base being itself biased by resistors 16 and 16*a*.

The conventional relay 4 is replaced by an electronic relay having no appreciable delay, thereby reducing the dead time errors. This electronic relay essentially comprises an amplifying transistor 43, a monostable or one-shot multivibrator constituted by transistors 44*a* and 44*b* and two transistors 45 and 46 for the discharge of capacitor 2 and the emission of a signal of frequency $f$.

During the charging of the capacitor, that is to say as long as the current supplied to the collector circuit of transistor 3 is practically zero, the base of transistor 43 is above cut-off and this transistor conducts current. The monostable multivibrator therefore has its transsistor 44*a* cut-off and its transistor 44*b* conducting. This cuts-off transistor 45 (the emitter of which receives at 45*a* a voltage of —5 volts whereas its emitter receives a voltage of +12 volts) and also transistor 46 (the base of which is connected to a terminal $X'_1$ at a potential of —24 volts for instance).

When transistor 3 becomes conducting (the charge of capacitor 2 having reached the reference potential —V) transistor 43 is cut off. This trigger multivibrator 44*a*, 44*b* the transistor 44*a* of which becomes conducting while emitting on its collector a voltage step which is transmitted to the base of transistor 45 (which is of the n-p-n type whereas the other transistors are all of the p-n-p type). This transistor therefore becomes conducting and the voltage applied at 45*b* discharges capacitor 2 through this transistor.

At the end of this discharge, the potential of plate 2*a* is reversed and transistor 46 becomes conducting. Its collector voltage rises again and, through diode 47, returns multivibrator 44*a*–44*b* to its initial condition: that is to say where transistor 44*b* is conducting and transistor 44*a* is cut off. Transistor 45 is therefore cut-off and stops the discharge of the capacitor the charge of which has become zero. A new cycle can then start again. The whole of the triggering operation (which is practically instantaneous) and of the discharge of the condenser lasts about 0.4 ms. and I collect at 48, on the collector of transistor 44*b*, a rectangular pulse $A_1$ of the same direction (FIG. 8), the period of repetition $d$ of pulses $A_1$ being equal to that of the saw teeth corresponding to the discharges of capacitor 2.

It will be noted that I make use of a monostable multivibrator (the collector of transistor 44*a* having been connected through a resistor to the base of transistor 44*b*, with a capacitor in shunt to accelerate triggering, whereas the collector of this transistor 44*b* is connected through a capacitor to the base of transistor 44*a*) so that the multivibrator is shortly returned to its initial condition (transistor 44*b* being conducting), even if the return pulse through diode 47 were not applied thereto.

Pulses $A_1$ are differentiated by a circuit including a capacitor 49 and a resistor 50, which gives an alternation of positive peaks $A_2$ and negative peaks $A_3$. The positive peaks $A_2$ (corresponding to the beginning of every pulse $A_1$) are the only ones to be applied, through diodes 51*a* and 51*b*, to the bases of two transistors 52*a*, 52*b* mounted to form a bistable multivibrator 6 (resistance coupling between the two stages). I thus obtain, at the output of multivibrator 6, at 53, a signal B comprising a rectangular pulse of width $d$ for every pair of pulses $A_1$ or of discharges A (FIG. 8).

Pulses B serve to modulate in amplitude the audio frequency created in the sinusoidal oscillator consisting of transistor 54, with a coupling between the tuned collector credit 55*a* and the turned transmitter circuit 55*b*. I thus obtain at 56 wave train C constituted by the chopping of the audio frequency by pulses B.

Wave trains C, after amplification by transistor 57, are filtered in filter 58, separated from their direct component by capacitor 59 and amplified by transistor 60. They can then be applied, through a transformer 40, to transmission channel 10 (the conductor $\mathbf{10}_0$ of which consitutes the ground), a potentiometer 61 making it possible to adjust the starting level of the transmitting signal $C_1$.

It will be noted that the transmitter may be fed with current either from a distribution network or from a battery of 48 volts (located between $X_1$ and $X'_1$) in view of the fact that its wholly constituted by transistors. In the case of a feed by a battery, it is advantageous to stabilize the whole arrangement by means of resistors (as shown) to reduce the influence of great variations of voltage of the battery on the dead time of discharge of the capacitor.

A complete construction of a receiver capable of cooperating with the transmitter of FIG. 7 is shown by FIG. 9 (constituted by the two portions 9*a* and 9*b* assembled along line Z—Z) whereas FIG. 10 shows the signals at different points of this receiver.

The receiver, which performs the integration of calibrated pulses derived from the signals received from the transmitter, successively performs the shaping of the signals received which are transformed into pulses, the calibration of these pulses and the integration of said pulses in order to supply a current proportional to the frequency of said pulses.

After filtering, in a filter 11, of the wave trains arriving through channel 10 (the receiver being no longer of the symmetrical type), I obtain signal C′, rather similar to the emitted signal $C_1$, with the exception of the fact that it contains noise. Two capacity coupled transistor amplifier stages 62 and 63 permit of obtaining the ampified signal C″ the level of which is adjustable by potentiometer 64. This signal is detected by transistor 65 which demodulates the wave train C″ and supplies a unidirectional voltage close to the maximum values of the sinusoidal voltage C″. The action of transistor 65 is completed by that of transistor 66 mounted as an emitter-follower, (which is equivalent for a transistor to the cathode-follower arrangement for an electronic tube) to obtain a peak clipping and the detected signal $C_2$ is thus produced.

Signal $C_2$ is transformed into a succession of rectangular signals by a bistable multivibrator 12′ comprising two transistors **67*a* and 67*b* mounted as a Schmidt trigger circuit, coupling being ensured through the emitters. This circuit serves to give the desired shape to $C_2$ by being triggered a first time when the voltage applied at 68 reaches, during its rise, a given conducting voltage and a second time when the voltage applied at 68 reaches, during its decrease, a cut-off voltage slightly lower than the above mentioned conducting voltage, this overlapping of the two voltages practically eliminating the influence of noise. I thus obtain at one of the terminals 69*a* and 69*b* of the trigger circuit, a signal B′ consisting of a succession of rectangular pulses, signal B′ being in fact a reconstitution of the signal B produced at the output of the bistable multivibrator 6** of the transmitter. This reconstitution would be perfect if the level at the input of the transmitter was higher than a given level defined by the biasing of the Schmidt trigger circuit and if the level of the noise was lower than this level. Experience has taught that the action of noise is practically without importance.

In order to obtain signal G comprising a peak voltage for every discharge of the capacitor, I may either perform a differentiation followed by a reversal of polarity of the negative peaks by rectification (case of FIG. 1) or, as shown, differentiate and rectify each of the signals issuing from circuit 12′. Thus the signal issuing at **69*a* is differentiated by a shunt circuit including capacitor 70*a* and resistor 71*a* and rectified by diode 72*a*, whereas the signal issuing at 69*b* is dofferentiated by capacitor 70*b* and resistor 71*b* and rectified by diode 72*b*. I thus obtain, at 73, pulses G the frequency of which is identical to the frequency of the discharges of capacitor 2** at the transmitter and therefore to value Q (represented by voltage U).

Pulses G are amplified in two capacitor-coupled transistor amplifier stages 74 and 75 and then used for counting purposes. Instead of sending them to a pulse counter, it is preferable to use them to produce a current proportional to their frequency, therefore to Q.

For this purpose, they are first transformed into amplitude and duration calibrated pulses. I first apply the amplified pulses G, available in the collector circuit of transistor 75, to the primary, tuned to a given frequency, of a transformer 76 the secondary of which then supplies sinusoidal wave portions constituting the signal K of FIG. 10, which signal is available at 77, and includes pulses of a well determined polarity equal to one-half of the period of the tuned transformer. Signal K is first amplified by transistor 78 the base potential of which is accurately stabilized by a Zener diode 79, then by two transistors 80 and 81 (the latter one being mounted as an emitter-follower) to produce a base clipping so as to obtain, by this succession of amplifications and base clippings, rectangular pulses L of constant duration (equal to one-half of the period of tuned transformer 76). I thus obtain a duration calibration. As for the amplitude calibration it is ensured by the Zener diode 82 mounted between the output of transistor 81 and the ground.

I therefore obtain, at 83, pulses L of constant duration and amplitude. These pulses L are applied simultaneously to the bases of transistors 84 and 85 mounted in shunt. The common collector current of these transistors has not an absolutely constant amplitude due to the variations of the characteristics of the transistors, in particular when the temperature varies. In order to obtain a constant amplitude, which is quite necessary in order to get an accurate measurement, I proceed as follows.

The collector current of transistors 84 and 85 passes through a potentiometer 86 on which are collected positive pulses L which are applied to the base of transistor 87 through a capacitor 98 of a sufficiently high capacity to prevent differentiation. The base of transistor 87 also receives, through capacitor 99, negative pulses proportional to the pulses L obtained at 83 .

The base of transistor 87 is then subjected to the resultant pulses, which may be either positive or negative. These resultant pulses are amplified by transistors 87 and 88 before being applied, through line 89, to the bases of transistors 84 and 85 for correcting the input signal arriving at 83. The system is automatically regulated so as to give the collector current of transistors 84, 85 a constant amplitude *a* up to temperature of about 60° C.

In order to measure *a* the collector current of transistors 84 and 85 is divided into two channels: one, which comprises capacitor 90, receives the alternating component, whereas the other, which comprises potentiometer 91 and a recording milliammeter 92, receives the direct component, these two components being combined in potentiometer 86.

The direct component $I_c$ is equal to $fat_k$, $t_k$ being the duration of pulses L. As *a* and $t_k$ are constants, this direct component is proportional to *f* and therefore is linear function of U and consequently of the magnitude Q to be telemetered.

Of course, since there has been provided in the receiver a possibility of measuring positive and negative magnitudes, *f* is not proportional to U $d_2$ is negative: curve $H_4$) and it is necessary to remove the constant $d_2$ introduced at the transmission. This is obtained by counter-current J produced by a stabilized voltage (of 20 volts for instance) applied between the terminals **93*a* and 93*b* (terminal 93*a* being the positive terminal). This current, adjusted by a potentiometer 94, is applied through conductors 10*a***.

The receiver is always connected to the distribution network. If so destred, an alarm device may be provided so as to indicate that the modulation is not received at the transmitter or that said receiver is not fed with current. This alarm device short-circuits at the same time the output 96 toward the utilization device or counter, which is absolutely necessary when there is a totalization counter, in particular in the case of an adjustment or control at a remote location. At the same time, this short-circuiting resets indicator 92 to zero (instead to the negative indication —Q) in the telemetering of a variable which may have both signs.

The system obtained according to my invention for metering, displaying and/or controlling at a remote location has many advantages and in particular the following ones:

It permits of obtaining an accurate telemetering of all magnitudes, in particular of electric powers.

It uses no moving part.

The consumption of current is reduced.

It permits of transmitting indications by a reduced number of conductors or by radio with a reduced bandwidth.

No current source is required at the place where is determined the magnitude to be telemetered.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A telemetering system for transmitting the magnitude of a physical quantity comprising in combination:
a transmitter comprising
transducing means for deriving from said quantity a first voltage proportional to the magnitude of the quantity,
integrator means comprising a resistor and a capacitor, said capacitor being connected to be charged by said first voltage through the resistor,
means for generating a reference voltage,
voltage comparator means having first and second inputs, said first input being connected across said capacitor to receive therefrom a second voltage proportional to the charge on said capacitor, the second input receiving said reference voltage, and an output delivering an electrical signal each time said second voltage becomes substantially equal to said reference voltage,
means connected to said output of said voltage comparator for discharging said capacitor in response to said electrical signal, whereby a substantially saw tooth voltage is produced across said capacitor having a repetition rate of substantial linear relation to said first voltage,
means for generating a carrier frequency and for producing a modulated carrier wave having a frequency proportional to the frequency of the saw tooth voltage,
means for transmitting to a distance the modulated carrier signal,
and a receiver comprising
means for deriving from said modulated carrier signal a pulse signal of a repetition frequency equal to that of said saw tooth voltage,
and means for measuring the repetition frequency of the pulses in said pulse signal, the repetition frequency being linearly related to said magnitude.

2. A telemetering system according to claim 1, comprising a further adjustable constant voltage source for charging said capacitor, said adjustable source comprising potentiometric means connected to said capacitor, whereby the repetition rate of said saw tooth voltage for any given first voltage may be adjusted by a substantially constant amount.

3. A telemetering system according to claim 1, wherein said voltage comparator comprises a transistor having an emitter constituting said second input, a base constituting said first input and a collector constituting said output.

4. A telemetering system according to claim 1, wherein said means for measuring the repetition frequency comprises counter means for counting the pulses in said pulse signal.

5. A telemetering system according to claim 1, wherein said means for producing a modulated carrier wave includes means for producing a rectangular wave of duration equal to the duration of a saw tooth of said saw tooth wave and repetition frequency of one-half the repetition frequency of said saw tooth wave, said rectangular wave modulating said carrier wave.

References Cited by the Examiner

UNITED STATES PATENTS

| | | | |
|---|---|---|---|
| 2,513,988 | 7/1950 | Wolff | 340—206 |
| 2,551,291 | 5/1951 | Rich | 324—142 |
| 2,615,063 | 10/1952 | Brown | 324—111 |
| 2,637,820 | 5/1953 | McCreary | 324—111 |
| 2,638,491 | 5/1953 | Turner | 324—111 |
| 2,731,626 | 1/1956 | Carolus | 340—206 |
| 2,761,968 | 9/1956 | Kuder | 340—206 |
| 2,883,650 | 4/1959 | Brockway | 340—206 |
| 2,919,408 | 12/1959 | Brown | 324—111 |
| 3,068,411 | 12/1962 | Galman | 324—142 |

NEIL C. READ, *Primary Examiner.*

L. MILLER ANDRUS, WALTER L. CARLSON, *Examiners.*